April 22, 1941.  W. R. WELLS  2,238,958
REFRIGERANT TESTING DEVICE
Filed Feb. 23, 1939   2 Sheets-Sheet 2
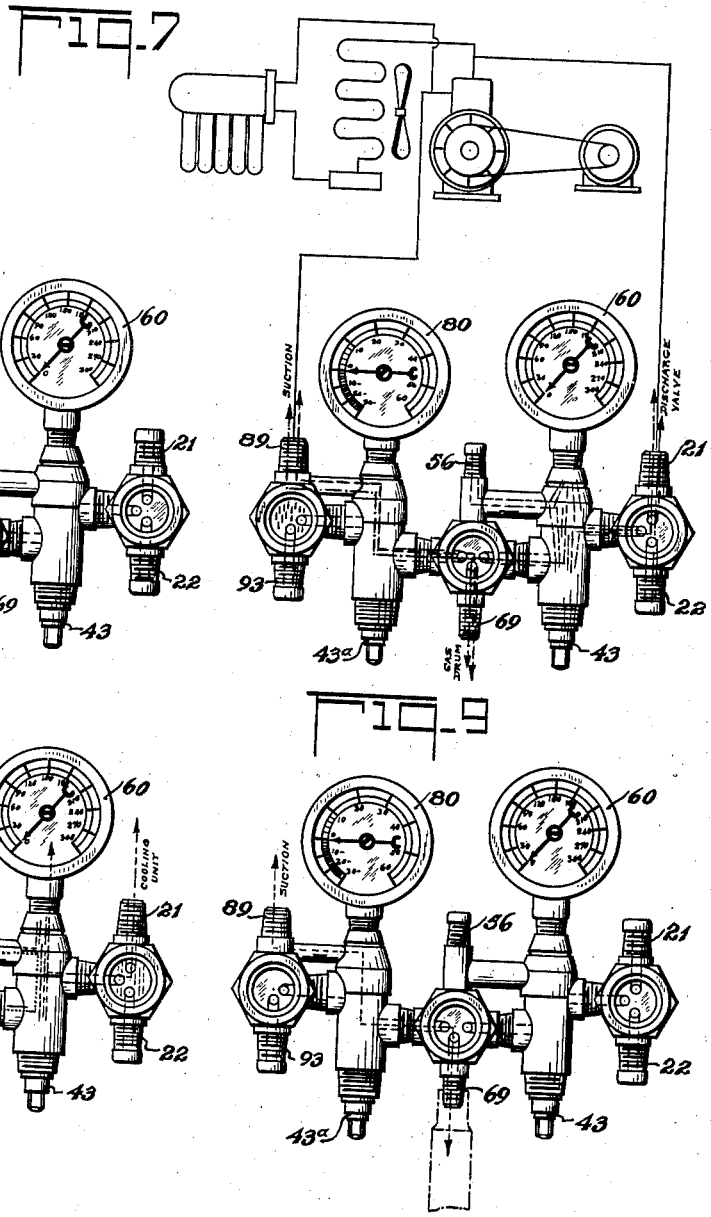
INVENTOR
Weaver R. Wells.
BY
Van Deventer & Grier
ATTORNEYS Patented Apr. 22, 1941

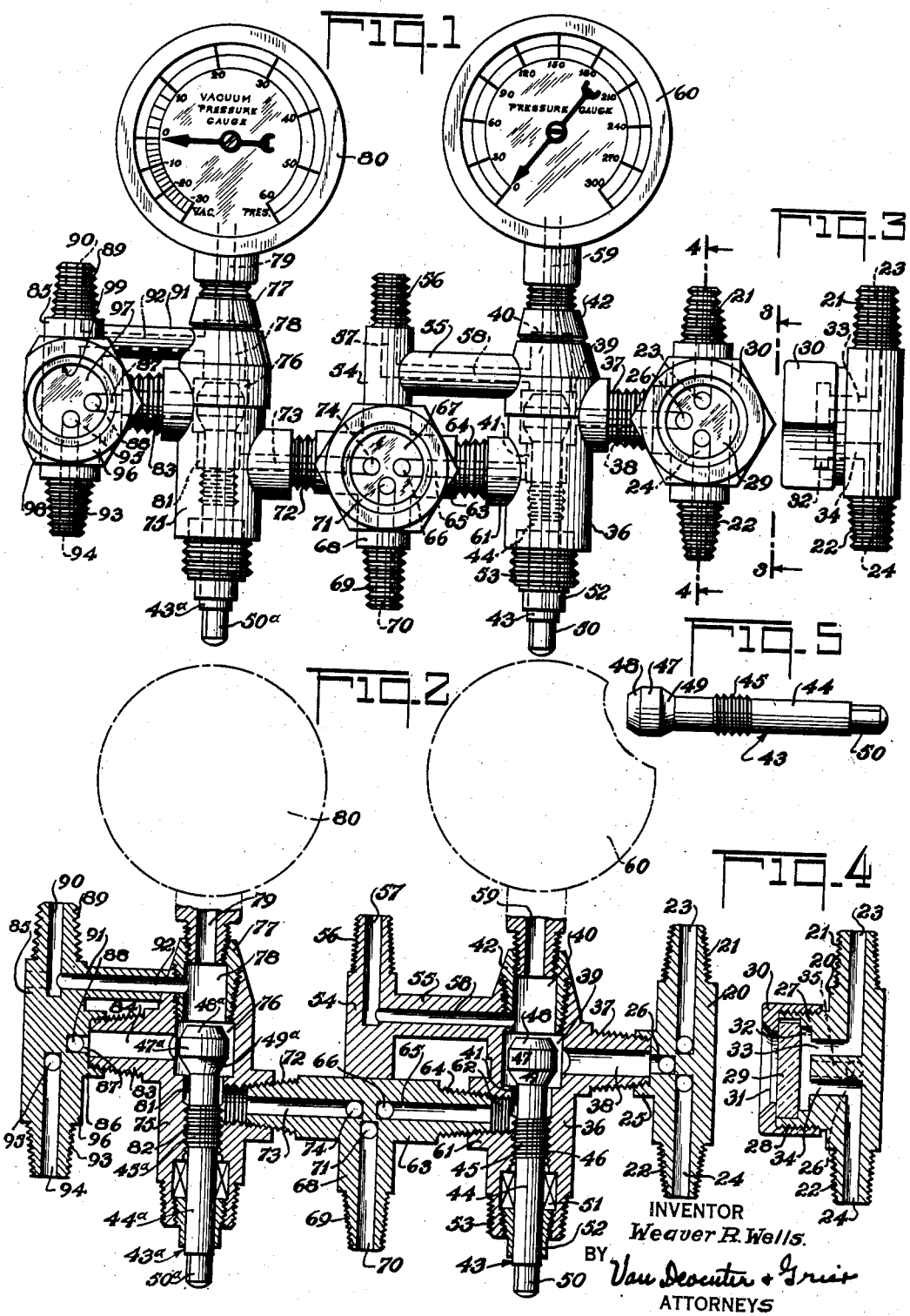

2,238,958

UNITED STATES PATENT OFFICE 2,238,958

REFRIGERANT TESTING DEVICE

Weaver R. Wells, Trinidad, Colo.

Application February 23, 1939, Serial No. 257,849

4 Claims. (Cl. 73—151)

This invention relates to improvements in refrigerant testing devices, and has for an object the provision of a device adapted to be associated with a refrigerating system whereby many service operations may be performed on said system and the results of said operations noted visually.

Another object of the invention is the provision of a testing device comprised of a body having a plurality of passages therein, valves for determining which paths a fluid medium may take in passing therethrough and visual indicators for indicating the pressure or vacuum impressed upon said fluid medium.

A further object of the invention is the provision of a testing device of the character stated, in which one or more windows is provided at the junction of a plurality of said passages so that the operator may observe the character of the fluid medium passing therethrough whether it be liquid refrigerant, lubricant, or gaseous refrigerant.

Other objects will immediately become apparent to those skilled in the art upon perusal of this specification and the appended claims.

Referring to the drawings which depict a preferred embodiment of the invention by way of example:

Figure 1 is a front elevation of the new and improved testing device;

Figure 2 is a sectional elevation of the device shown in Figure 1;

Figure 3 is an elevation of the right end portion of the device taken along the line 3—3, Figure 1;

Figure 4 is a sectional elevation of the portion shown in Figure 3 as taken along the line 4—4 of Figure 1;

Figure 5 is a view showing one type of valve employed in the device;

Figure 6 is a diagrammatic sketch illustrating the use of the device in testing the suction of a refrigerating compressor and for adding gaseous refrigerant to the system;

Figure 7 is a diagrammatic sketch to illustrate the use of the device in testing the suction pressure, the condensing pressure, suction and discharge capacity of the compressor, to add liquid refrigerant, or to remove gas or air from the system;

Figure 8 is a diagrammatic sketch to illustrate the use of the device in testing both the suction and discharge pressures, the amount and condition of liquid refrigerant, oil and carbon formation deposits in the liquid, the adding or removal of liquid refrigerant, and the adding of gas and the removal of gas or air; and Figure 9 is a diagrammatic sketch to illustrate the use of the device in adding oil to the compressor, and in testing pressure-vacuum cold controls.

The new and improved device consists of a body having passages formed therein. Observation windows are provided at several junctions of the passages. Suitable gages are carried on the body and valves are provided for the communication of some passages with each other or for the isolation of others from each other or from the gages thereby making it possible for the service man to immediately determine what is wrong and to apply the necessary remedies with the greatest facility and without loss of time.

Referring to Figures 1 and 2, a member 20 is provided with a threaded fitting 21 at one end thereof and a threaded fitting 22 at the other end. A passage 23 extends into the member via the fitting 21 and a passage 24 extends into the member via the fitting 22. A boss 25 extends from one side of the member 20 and is provided with female threads. A passage 26 extends from the boss 25 into the body 20. A boss 27 projects from the member 20 at right angles to the boss 25 and is provided with a male thread 28. A clear glass disk 29 is mounted in a suitable depression formed in the boss 27 and is secured thereto by means of a nut 30 fitting the threads 28 and having formed therein an opening 31.

Behind the glass disk 29 is a chamber 32. A passage 33 communicates with the passage 23 and with the chamber 32. A passage 34 communicates with the passage 24 and with the chamber 32, and a passage 35 communicates with the passage 26 and with the chamber 32, so that the chamber 32 forms a junction with the three passages 23, 24 and 26. The opening 31 and the glass disk 29 form a window through which liquids passing through the chamber 32 may be observed.

A member 36 has a threaded fitting 37 extending therefrom at right angles to its axis, and by means of the fitting 37 engaging the female threads, the members 20 and 36 are secured together in fluid-tight relation.

A passage 38 extends through the fitting 37 and into the body of the member 36 and forms an extension of the passage 26.

Within the body 36 is a valve chamber 39 having a passage 40 communicating therewith at one end of the chamber and a passage 41 communicating therewith at the other end of the chamber 39. The passage 40 has formed therein a threaded bushing 42 which is secured to the body 36 after the valve member which will presently be described is positioned within the body of the member 36.

A valve, generally designated by the numeral 43, consists of a shaft or stem 44 having a threaded portion 45 engaging threads 46 formed within the member 36 and the head portion 47 positioned within the chamber 39. When the valve is screwed in (moved upwardly as shown in Figure 2) its face or seat 48 engages the lower end of the bushing 42 and thereby isolates the passage 40 from the chamber 39.

When the valve is screwed downwardly, the face or seat 49 isolates the passage 41 from the chamber 39. The lower end of the valve stem 50 is stepped and milled square so that it may be turned by means of a suitable socket wrench.

Details of the valve 43 may be seen in Figure 5. The member 36 is provided with a stuffing box gland 51 embracing the valve stem 44 and is provided with a suitable adjusting nut 52. Adjacent to the stuffing box, the member 36 is provided with an external thread 53 whereby a suitable sealing cap may be applied when desired.

A member 54 is connected to the member 36 by a column 55 and is provided with a threaded fitting 56. A passage 57 extends into the member 54 via the fitting 56 and communicates with a passage 58 extending through the column 55 to communicate with the passage 40. A suitable pressure gage 60 has its interior passage 59 in communication with the passage 40.

The member 36 also has extending therefrom, preferably parallel to the column 55, a boss 61 which is provided with a female threaded hole 62 communicating with the passage 41.

A member 63 is provided with a fitting 64 which fits the threaded hole 62, thereby connecting the member 63 to member 36 in fluid-tight relationship. A passage 65 then communicating with passage 41 extends into the body of the member 61 via the threaded fitting 64 and which in turn communicates with a passage 66 which terminates in a chamber behind the window 67.

The body 63 has an extension 68, the end 69 of which forms a threaded fitting and has a passage 70 extending inwardly from the fitting 69 to communicate with the cross passage 71 which also terminates in the chamber behind the window 67. The body 61 has an extended portion terminating in the threaded bushing 72. A passage 73 extends into the member 61 via the fitting 72 and communicates with a cross passage 74 which also terminates in the chamber behind the window 67.

A member 75 has a valve chamber 76 formed therein. A bushing 77 has a passage 78 formed therein which communicates with the chamber 76 when said bushing is screwed into the member 75 (after the valve is inserted).

Since the valve is exactly like the valve 43 previously described, the same numerals will be applied to the same portions with the addition of the letter *a*. Therefore, the valve in the member 75 will be generally designated by the numeral 45a.

A passage 81 formed within the member 75 has a portion thereof communicating with the passage 73 and a portion of which is threaded and designated by the numeral 82. The threads 45a on the valve stem fit threads 82 so that when the valve stem 43 is rotated in a clockwise direction as viewed from the bottom, the face 48a will close off the chamber 76 from the passage 78, and when the valve stem is rotated in a counterclockwise direction as viewed from the bottom, the valve seat 49a will close off the chamber 76 from the passage 81.

The body 86 has a projecting portion forming a fitting 83 and the passage 84 formed therein communicates with the chamber 76.

A gage 80 has its shank with the passage 79 formed therein screwed into the bushing 77 so that the passage 79 communicates with the passage 78. The gage 80 may be a combined vacuum and pressure gage.

A body member 85 has a boss 86 extending therefrom and threaded on to the fitting 83. A passage 87 extends from the body 86 into the body 85 and terminates in a cross passage 88 which will presently be described. A threaded fitting 89 at one end of the member 85, has a passage 90 formed therein extending into the body 85. A column 91 extends from the member 85 to the member 75 and has a passage 92 formed therein, one end of which communicates with the passage 78 and the other end of which communicates with the passage 90. The member 85 has its other end forming a fitting 93, and a passage 94 formed therein extends into the body of the member 85 and terminates in a cross passage 95. A boss 96 similar to the boss 27 projects from the member 85 at right angles to the passages 84, 87 and is provided with a male thread similar to the thread 28. A clear glass disk 97 similar to the disk 29 is mounted in a suitable depression formed in boss 96 and is secured thereto by means of a nut 98 fitting the male threads above referred to and having formed therein an opening 99.

Behind the glass disk 97 is a chamber (not shown but similar to the chamber 32) with which the cross passages 88 and 95 communicate, so that the chamber forms a junction with the two passages 88 and 95. The opening 99 and the glass disk 97 form a window through which fluids passing through the chamber may be observed.

Although the device is described as comprised of a plurality of bodies or members joined or screwed together to form a unit, it is obvious to those skilled in the art that many of the joints described may be eliminated without departing from the spirit of the invention.

In order to show the flexibility of my new and improved device, several uses of the same will now be described.

*Operation No. 1*

Suppose it is desired to test the suction pressure on a refrigerating system and to add gaseous refrigerant to said system. The device is connected up as indicated in Figure 6. The fittings 21, 22, 56 and 93, are closed off with caps. The fitting 89 is connected to the suction of the refrigerating machine to be tested and the fitting 69 is connected to a refrigerant drum.

Before the above described connections are made, the valve 43a is closed in tight so that its seat 48a closes off the passage 78 from the chamber 76 and the valve 43 is closed in its outward position in such a manner that its seat 49 closes off the chamber 39 from the passage 41. In making the connection described, the tube connected to the gas drums should be purged. Now when the suction valve on the compressor is turned part way in, the suction pressure will then register on the gage 80. To add gas to the system, the valve 43a should be partially opened, the gas drum should be set with the valve end up, after which the valve on the gas drum may be opened and gas will be drawn into the system through the passage 70, the chamber behind the window 67, the passages 73, 81, the chamber 76 and via the passages 78, 92, 90 and the tubing connected to the suction of the compressor.

*Operation No. 2*

Suppose it is desired (a) To test the suction and the discharge or condensing pressures of the system
(b) To add liquid refrigerant.

The setting for these operations is shown in Figure 7. A tubing is connected from the compressor suction valve to the fitting 89. Another piece of tubing connects the compressor discharge valve on the compressor head to the fitting 21. The valves 43a and 43 are both closed outwardly tight thereby respectively shutting off the passage 81 from the chamber 76 and the passage 41 from the chamber 39. The fittings 93, 56 and 22 are capped. The fitting 69 may either be capped for the time being or if gas is to be added or removed, it may be connected with a piece of tubing to the gas drum.

Now for (a) above, turn the suction and discharge valves on the compressor partly in, and the suction pressure will register on the gage 68 and the discharge or condensing pressure will register on the gage 60.

Referring to (b) to add liquid refrigerant, the valve 43a is closed outwardly in order to isolate the passage 81, and the passages connected therewith, from the chamber 76 which is connected to the suction. The valve 43 is closed part way in, in order to place the passage 41, the chamber 39 and the passage 40 in communication with each other. The gas drum should be heated to a higher temperature than that of the condenser, after which, with the drum turned with its valve end down, the drum valve is opened and liquid will enter the system through the compressor discharge valve (through the passages 70, 65 to the passage 41, thence via the chamber 39 to the passages 38, 23 and via the tubing to the compressor discharge valve).

If it is desired to add gaseous refrigerant to the system instead of liquid refrigerant, it is not necessary to heat the gas tank. The valve 43 would be closed all the way out so as to close off the passage 41 from the chamber 39, and the valve 43a is closed partially in and the gas drum is positioned with its valve end up, after which when the valve on the gas drum is opened, gas will be drawn into the suction side of the system in the manner described in connection with Operation No. 1.

*Operation No. 3*

Although this is described as Operation No. 3, a number of operations may be accomplished with this setup which is diagrammatically indicated in Figure 8. A piece of tubing connects the suction valve of the compressor to the fitting 89. The discharge valve of the compressor is connected by means of a piece of tubing to the fitting 93. The liquid valve on the receiver tank of the system is connected with a piece of tubing to the fitting 56. The coil or cooling unit of the system is connected by means of a piece of tubing to either the fitting 21 or the fitting 22, whichever is most convenient. In Figure 8 it is indicated as connected to the fitting 21 in which event the fitting 22 is capped. Were it connected to 22 instead of 21, the fitting 21 would be capped. A piece of tubing may be used to connect the valve on the gas drum to the fitting 69. The valve 43a is closed all the way in, thereby isolating the passage 78 from the chamber 76 and the valve 43 is closed all the way out, thereby isolating the chamber 39 from the passage 41.

The liquid valve on the receiver tank may be opened and liquid refrigerant from the receiver will enter the tester through the fitting 56, the passage 58, the passage 40, the chamber 39, the passage 38, the passage 35 to the chamber 32, and thence out via the passages 35 and 23 to the cooling unit. Through the glass disk 29 the gas passing through the chamber 32 may be clearly seen. If the refrigerating unit is nearly empty, gas will be seen rushing through the chamber 32. If the system is slightly short of gas, bubbles may be seen passing through the chamber 32. If carbon-like particles (which are especially prevalent in sulphur dioxide systems) are seen passing through the chamber 32, this indicates that there is moisture in the system. In case it is necessary to add refrigerant, it may be added in gaseous form as explained in Operation No. 1, or in liquid form, as explained in Operation No. 2.

A. If added in gas form, close the discharge valve of compressor all the way out. This closes off gas entering the device via the fitting 93. Open the valve on the gas drum with the valve end up. Now turn the valve 43a part way out so that gas from the drum may then be drawn into the compressor through the following path: Through the passage 70 and the fitting 69 into the chamber behind the glass indicator 67, thence via the passage 73, the passage 81, the chamber 76 and the passages 78, 92, 90, to the suction valve of the compressor.

B. If refrigerant is to be added in liquid form, the valve 43a is closed all the way in, the drum is heated to bring its pressure higher than that of the condensing pressure, the discharge valve on the compressor head is turned part way in, the gas drum is then turned so its valve will be on the bottom, after which its valve may then be opened and liquid will flow from the drum and thence via to passages 70, 73, 81, the chamber 76 and the passages 84, 94 to the compressor. The indicator 67 may be watched for bubbles.

To remove gas or air from the system, the gas drum is cooled to a temperature lower than that of the condenser and with the arrangement described in B above, air first, then gas, will enter the drum in the reverse direction to that explained in B above. The contents of the entire system may be discharged into the drum (provided it has sufficient capacity), by closing the discharge valve on the compressor head all the way in and keeping the gas drum cool.

To remove liquid refrigerant from the receiver tank into the gas drum, the following steps may be taken:

With the gas drum cool and with the discharge valve on the compressor closed all the way out; the valve 43a closed in tight and with the valve 43 part way in, gas in liquid form will flow from the receiver valve through the passage 57 in the fitting 56, the passage 58, the passage 40, the chamber 39, thence via the passages 65 and 70 to the gas drum. The liquid passing through may be seen in the indicator 67.

Operation No. 4

In testing the pressure vacuum cold controls, the connections are indicated diagrammatically, Figure 9. The fittings 93, 21 and 22 are capped. The fitting 89 is connected to the cold control. The valve 43a is turned all the way out and then just cracked in. The valve 43 is turned part way in. The fitting 69 is connected to a pressure vacuum pump which may, for convenience, be a hand type. The cap shown in Figure 9 is omitted from the fitting 56 and with the finger over the end of this fitting pressure and/or vacuum can be obtained to test and adjust the cold control.

Operation No. 5

Suppose it is desired to add oil to the compressor. The arrangement shown in Figure 9 would be modified so that the fitting 89 is connected to the suction of the compressor, and the fitting 69 instead of being connected to the pressure vacuum pump is connected to a short length of tubing, one end of which is submerged in a glass or other vessel of oil. The valve 43a is turned in a sufficient amount to allow oil to be sucked from the container. The valve 43a may then be closed to its seat 48a before air can pass into the compressor.

From the examples of operation herein given, it may be seen that my new and improved device is very flexible and may be used for many service operations, and the operations herein given are merely by way of example, as many other operations will be apparent to those skilled in the art. It is also obvious that many changes may be made in the arrangements herein shown and described without departing from the spirit of the invention as set forth in the annexed claims.

When any of the above tests have been completed, the small amount of liquid or gas remaining in the tester or in the tubing leading to the drum or liquid line may be almost instantly emptied by slowly opening the valve 43a thereby allowing the compressor to draw all gas therefrom via the fitting 89.

In cases where there are indications of too much liquid refrigerant in a system (which means that the receiver is full and liquid has backed up into the compressor so that the condensing pressure is too high) liquid should be removed into a drum until bubbles appear in the visual indicator, passing from the receiver to the coils. After the bubbles appear enough extra refrigerant should be added to allow the bubbling to stop, plus a little more in some cases. This feature can only be accomplished by means of a tester employing a visual window such as I have shown, described and claimed.

It is customary with most service men to believe that because the equipment is not cooling properly it must need more gas as gas is what makes refrigeration, with the result that they add more liquid refrigerant, filling the compressor and receiver and sometimes the pump. The latter acts as a hydraulic pump and forces liquid in where no room exists. Many a receiver tank has had its end blown out due to this and in many cases serious accidents, jeopardizing the lives of the service men, have occurred.

As pointed out above, the ability to see the gas passing through the tester and the ability to see the bubbles eliminates one of the greatest hazards against which service men have to work.

In the appended claims, the chambers 40 and 76 are termed "valve chambers"; the chamber 32 behind the transparent disk 29 and the chambers behind the transparent disks 67 and 97, are termed "observing chambers". The valve means includes a double acting valve head 47 having a face 48 which, when the valve stem 44 is screwed in, isolates the valve chamber 39 from the passageway 40, 59, communicating with the gauge 60, and the valve face 49 which, when the valve is screwed outwardly as far as it will go, isolates the passageway 41, 65, 66, leading to the observing chamber 67 from the valve chamber 39. The valve means 47a is similar except that it is associated with the low pressure gauge 80.

What is claimed is:

1. In a testing device for refrigerating systems or the like, in combination, a body, a valve chamber formed in said body, a second valve chamber formed in said body and spaced apart from said first chamber, a high pressure gauge on said body communicating with said first valve chamber, a low pressure gauge on said body communicating with said second valve chamber, an observing chamber in said body permanently communicating with said first valve chamber, at least one fitting on said body communicating with said observing chamber, a second observing chamber in said body permanently communicating with said second valve chamber, a second fitting on said body communicating with said second observing chamber, a third observing chamber in said body having a passage extending therefrom to said first valve chamber and a second passage extending therefrom to said second valve chamber, a third fitting on said body communicating with said third observing chamber, a valve in said first valve chamber adapted in one position to isolate its chamber from said high pressure gauge and adapted in another position to isolate its chamber from said third observing chamber, a valve in said second valve chamber adapted in one position to isolate its chamber from said low pressure gauge and adapted in another position to isolate its chamber from said third observing chamber, a fitting on said body communicating with said high pressure gauge, and a fitting on said body communicating with said low pressure gauge.

2. In a testing device for refrigerating systems or the like, a body, an observing chamber formed in said body and including a transparent disk through which fluid medium passing therethrough may be observed, a fitting on said body communicating with said observing chamber, a high pressure gauge on said body, a passageway extending from said gauge to said observing chamber, a valve chamber formed in said body and located in series with said passageway, a valve in said valve chamber adapted to isolate said observing chamber from said valve chamber when in one position, and adapted to isolate said gauge from said valve chamber when said valve is in another position, a passageway leading to said valve chamber and terminating in a fitting in said body, a passageway leading to said gauge and terminating in a fitting in said body, a low pressure gauge mounted on said body, a passage leading from said observing chamber to said low pressure gauge, a valve chamber in series with said last-mentioned passage and including a valve adapted when in one position to isolate said observing chamber from said valve chamber, and adapted when in another position to isolate said low pressure gauge from said valve chamber, a passage leading to said last-mentioned valve chamber and terminating in a fitting on said body, and a passage in said body leading to said low pressure gauge and terminating in a fitting on said body whereby an operator may selectively associate said gauges and the passages associated therewith with said observing chamber.

3. In a device for testing refrigerating systems or the like, a body, a plurality of observing chambers each having an externally extending passage terminating in a fitting on said body, passages between said observing chambers placing said chambers in communication with each other, valve means in said passage between one of said chambers and another of said chambers adjacent thereto, a second valve means in said passage between said one of said chambers and still another of said chambers adjacent thereto, each of said valves being mounted in an individual valve chamber serially arranged in the passage with which it is associated, a high pressure gauge on said body communicating with one of said valve chambers, a low pressure gauge on said body communicating with the other of said valve chambers, said gauges being adapted to be isolated from their associated valve chambers by the valve means in said valve chambers, and individual passages leading from said gauges and terminating in other fittings in said body.

4. In a testing device for refrigerating systems or the like, in combination, a body, a valve chamber formed in said body, a second valve chamber formed in said body and spaced apart from said first chamber, a pressure gauge on said body, a passageway between said gauge and said first valve chamber, an observing chamber in said body including a transparent disc through which fluid mediums passing therethrough may be observed, a passage in said body joining said observing chamber to said first valve chamber, a pair of oppositely disposed passages in said body extending from said observing chamber and terminating in a first and a second external fitting, a second observing chamber in said body, a passageway in said body between said first valve chamber and said second observing chamber, valve means in said first valve chamber, adapted when in one position to isolate its chamber from said gauge and when in another position to isolate its chamber from said second observing chamber, a passageway in said body joining said second observing chamber to said second valve chamber, a second pressure gauge carried on said body, a passageway in said body between said second valve chamber and said second gauge, a second valve means in said second valve chamber, adapted, when in one position, to isolate its chamber from said second observing chamber, and when in another position, to isolate its chamber from said second gauge, a third observing chamber in said body and having a passageway extending therefrom to said second valve chamber, a passageway in said body extending from said second observing chamber and terminating in a third external fitting, a passageway in said body extending from said third observing chamber and terminating in a fourth external fitting, a fifth external fitting on said body having a passageway communicating with said first gauge, and a sixth external fitting having a passageway communicating with said second gauge, whereby said device may be interconnected with the high and the low sides of a refrigerating system, and said chambers and passageways may be associated or isolated to determine the conditions in said system and to expedite the servicing of the same.

WEAVER R. WELLS.